United States Patent
Yamagishi et al.

(10) Patent No.: US 8,658,737 B2
(45) Date of Patent: Feb. 25, 2014

(54) ACRYLIC RUBBER COMPOSITION AND CROSS-LINKED PRODUCT THEREOF

(75) Inventors: Uichiro Yamagishi, Itoigawa (JP); Yasushi Abe, Itoigawa (JP); Toshiaki Miyauchi, Itoigawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/390,637

(22) PCT Filed: Aug. 18, 2010

(86) PCT No.: PCT/JP2010/063927
§ 371 (c)(1),
(2), (4) Date: Feb. 15, 2012

(87) PCT Pub. No.: WO2011/021641
PCT Pub. Date: Feb. 24, 2011

(65) Prior Publication Data
US 2012/0141711 A1 Jun. 7, 2012

(30) Foreign Application Priority Data
Aug. 20, 2009 (JP) .................. 2009-190639

(51) Int. Cl.
C08F 8/30 (2006.01)
C08L 33/02 (2006.01)

(52) U.S. Cl.
USPC ............. 525/100; 525/326.8; 525/329.7; 525/329.9; 525/330.7; 525/331.1

(58) Field of Classification Search
None
See application file for complete search history.

(56) References Cited

U.S. PATENT DOCUMENTS

| | | | |
|---|---|---|---|
| 5,166,244 A * | 11/1992 | Fukushima et al. | 524/269 |
| 6,015,860 A | 1/2000 | Kuzumaki et al. | |
| 6,627,691 B2 * | 9/2003 | Mowrey et al. | 524/492 |
| 6,933,339 B2 * | 8/2005 | Aimura et al. | 524/430 |
| 7,449,521 B2 * | 11/2008 | Takesada et al. | 525/103 |
| 2002/0061961 A1 | 5/2002 | Yabe et al. | 524/827 |
| 2004/0266922 A1 | 12/2004 | Kanba et al. | 524/237 |
| 2011/0128629 A1 * | 6/2011 | Takahashi et al. | 359/601 |

FOREIGN PATENT DOCUMENTS

| | | |
|---|---|---|
| EP | 1 449 881 A1 | 8/2004 |
| EP | 2 177 564 A1 | 4/2010 |
| JP | 03-047855 | 2/1991 |
| JP | 04-041544 | 2/1992 |
| JP | 04-117475 | 4/1992 |
| JP | 04-0175370 | 6/1992 |
| JP | 10-007803 | 1/1998 |
| JP | 10-245451 | 9/1998 |
| JP | 11-080488 | 3/1999 |
| JP | 11-92614 * | 4/1999 |
| JP | 11-100478 | 4/1999 |
| JP | 11-140264 | 5/1999 |
| JP | 2006-152050 | 6/2006 |
| WO | WO 2009/022499 A1 | 2/2009 |

OTHER PUBLICATIONS

Machine Translation of JP 10245451 A; 1998.*
Machine-generated translation of JP 11-92614 into English (1999).*
International Search Report issued in PCT/JP2010/063927 on Nov. 30, 2010.
European Search Report dated Feb. 6, 2013, issued in corresponding European Patent Application No. 10809982.1.

* cited by examiner

Primary Examiner — Marc Zimmer
(74) Attorney, Agent, or Firm — Stein IP, LLC

(57) ABSTRACT

Provided is an acrylic rubber composition including an acrylic rubber and a functionalized silicone oil. Here, the functionalized silicone oil preferably has a particular polydimethylsiloxane structure having at least one binding site bonded with at least one of a monoamino group, a diamino group, a polyether group, an epoxy group, an alicyclic epoxy group, a hydroxyl group, a thiol group, a carboxyl group, a hydrogen group (Si—H group), a methacryl group, a phenol group, an alkoxy group, an ester group, an amide group, an alkyl group, a fluoroalkyl group, and a diol group and has a functional group equivalent weight of 1 to 100,000 (g/mol). The composition is unlikely to be deteriorated even when it is exposed to high temperature for a long time and that has excellent heat resistance and a crosslinked product of the composition. The composition is unlikely to be deteriorated even when it is exposed to high temperature for a long time and that has excellent heat resistance and a crosslinked product of the composition.

13 Claims, No Drawings

ACRYLIC RUBBER COMPOSITION AND CROSS-LINKED PRODUCT THEREOF

CROSS-REFERENCE TO RELATED APPLICATIONS

This application is a National Phase of PCT International Patent Application No. PCT/JP2010/063927, filed Aug. 18, 2010, which claims benefit to Japanese Patent Application No. 2009-190639, filed Aug. 20, 2009, in the Japanese Patent Office, the disclosures of which are incorporated herein by reference.

BACKGROUND OF THE INVENTION

1. Field of the Invention

The present invention relates to an acrylic rubber composition that is unlikely to deteriorate even when it is exposed to high temperature for a long time and that has excellent heat resistance and a cross-linked product of the composition.

2. Description of the Related Art

An acrylic rubber composition has excellent heat resistance and oil resistance and hence has been used for hoses and seals in the engine compartment of automobiles. However, due to recent emission controls, higher engine power, and the like, such a member has been used in a much higher temperature condition, and thus the component is required to have higher heat resistance than ever before.

An unvulcanized acrylic rubber is likely to adhere to a metal surface of a kneading machine such as a Banbury mixer, a kneader, and an open-roll kneader during kneading and thus such a kneading machine often requires cleaning after the kneading. On this account, there is a demand for an acrylic rubber that is unlikely to adhere to the metal surface and has excellent processability.

There are a known acrylic rubber composition including a cross-linking site having a carboxyl group as an acrylic rubber material having processability, mechanical characteristics, compression set characteristics, heat resistance, and the like in balance (for example, see Patent Document 1) and a known technique of mixing a particular carbon black to an acrylic rubber composition.

As an approach to improve the heat resistance of the acrylic rubber, there is a technique of blending an extreme elastomer (an elastomer having excellent heat resistance and oil resistance, such as a fluorocarbon rubber, a fluorosilicone rubber, and a silicone rubber) to the acrylic rubber. Known examples include a technique of blending a silicone rubber to an acrylic rubber for peroxide cross-linking (for example, see Non-Patent Document 1).

For the prevention of the adhesion to a metal surface, the addition of an internal mold release agent such as an ester wax, a paraffin wax, and a silicone oil to the acrylic rubber is considered to be effective. For example, for the improvement of roll adhesiveness, there is disclosed a technique of adding a silicone oil having a methacryl group in the molecule to an acrylic rubber (Patent Document 3). However, there is no description about a carboxy group-containing acrylic rubber and about the effect on heat resistance in Patent Document 3. The carboxy group-containing acrylic rubber has excellent heat resistance while it has poor roll adhesiveness and therefore there is a demand for a method for solving such a problem.

There is also known acrylic rubber composition including an unsaturated dicarboxylic acid monoalkyl ester copolymerized acrylic elastomer and an amine vulcanizing agent in order to improve oil resistance, compression set characteristics, and the like (Patent Document 4). However, the acrylic rubber composition produces a vulcanized product having insufficient heat resistance and is required to be improved.

CITATION LIST

Patent Documents

[Patent Document 1] Japanese Unexamined Patent Application Publication No. 11-100478
[Patent Document 2] Japanese Unexamined Patent Application Publication No. 11-80488
[Patent Document 3] Japanese Unexamined Patent Application Publication No. 10-245451
[Patent Document 4] Japanese Unexamined Patent Application Publication No. 11-140264

Non Patent Document

[Non-Patent Document 1] Umeda, I. et al., Rubber World, 1989, 201, 20

SUMMARY OF THE INVENTION

In order to solve the problems, it is a main object of the present invention to provide an acrylic rubber composition having excellent processability, mechanical characteristics, compression set characteristics, and heat resistance in balance and a vulcanized product of the composition.

That is, the present invention is an acrylic rubber composition including a functionalized silicone oil. The functionalized silicone oil is preferably included in an amount of 0.3 to 30 parts by mass based on 100 parts by mass of the acrylic rubber.

In the acrylic rubber composition, the silicone oil has a polydimethylsiloxane structure represented by General Formula 1 and having at least one of binding sites α, β, and γ bonded with a functional group and has a functional group equivalent weight of 1 to 100,000 (g/mol).

[C.1]

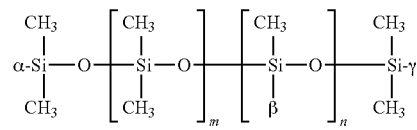

General Formula 1

As the acrylic rubber, one or more of a carboxyl group-containing acrylic rubber, an epoxy group-containing acrylic rubber, and an active chlorine group-containing acrylic rubber are desirably used. The acrylic rubber composition may further include at least one compound of an aromatic polyamine and an aliphatic polyamine. As the aromatic polyamine, a compound represented by General Formula 19 may be used.

[C.2]

 General Formula 19

(In the formula, M represents one of O, S, SO2, CONH, and O—R—O. R in O—R—O represents one of Ph, Ph-Ph, Ph-SO2-Ph, (CH2)m, Ph-CH2-C(CX3)2-CH2-Ph, and (CH2)C(CH3)2(CH2). Ph represents a benzene ring. m is 3 to 5, X is H or F, and Ph is a benzene ring)

The acrylic rubber composition may be vulcanized to produce a cross-linked product composition, and the cross-linked product composition may be used to produce a rubber hose, a seal, a rubber vibration isolator for an automobile, a rubber tube, an industrial belt, an industrial rubber vibration isolator, a wire covering rubber, or a boot material for an automobile.

In the present specification, the expression "a numeral to another numeral" means "the former numeral or more" and "the latter numeral or less". For example, the range of "A to B" means A or more and B or less and the range includes A and B.

An acrylic rubber composition having excellent heat resistance and a cross-linked product of the composition can be obtained.

Additional aspects and/or advantages of the invention will be set forth in part in the description which follows and, in part, will be obvious from the description, or may be learned by practice of the invention.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The acrylic rubber composition of the present invention is obtained by kneading an acrylic rubber and a functionalized silicone oil <Acrylic Rubber>

The acrylic rubber used in the present invention is obtained by polymerizing an unsaturated monomer such as a (meth) acrylic acid alkyl ester by a known method such as emulsion polymerization, suspension polymerization, solution polymerization, and bulk polymerization. Among them, the emulsion polymerization under ambient pressure is preferred because the polymerization reaction can be readily controlled.

For the polymerization by the emulsion polymerization, any of a batch system, a semi-batch system, and a continuous system may be employed. A commonly used polymerization initiator, polymerization terminator, emulsifier, and the like may be used. The polymerization is typically carried out at a temperature ranging from 0 to 70° C. and preferably 5 to 50° C.

The acrylic acid alkyl esters usable in the present invention are methyl acrylate, ethyl acrylate, n-propyl acrylate, isobutyl acrylate, n-butyl acrylate, n-pentyl acrylate, n-hexyl acrylate, n-octyl acrylate, and 2-ethylhexyl acrylate, but are not limited to them.

Other usable examples include n-decyl acrylate, n-dodecyl acrylate, n-octadecyl acrylate, cyanomethyl acrylate, 1-cyanoethyl acrylate, 2-cyanoethyl acrylate, 1-cyanopropyl acrylate, 2-cyanopropyl acrylate, 3-cyanopropyl acrylate, 4-cyanobutyl acrylate, 6-cyanohexyl acrylate, 2-ethyl-6-cyanohexyl acrylate, and 8-cyanooctyl acrylate.

Usable examples further include acrylic acid alkoxyalkyl esters such as 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate, and 2-(n-butoxy)propyl acrylate.

Usable examples further include fluorine-containing acrylic acid esters such as 1,1-dihydroperfluoroethyl(meth) acrylate, 1,1-dihydroperfluoropropyl(meth)acrylate, 1,1,5-trihydroperfluorohexyl(meth)acrylate, 1,1,2,2-tetrahydroperfluoropropyl(meth)acrylate, 1,1,7-trihydroperfluoroheptyl (meth)acrylate, 1,1-dihydroperfluorooctyl(meth)acrylate, and 1,1-dihydroperfluorodecyl(meth)acrylate; hydroxy group-containing acrylic acid esters such as 1-hydroxypropyl (meth)acrylate, 2-hydroxypropyl(meth)acrylate, and hydroxyethyl(meth)acrylate; tertiary amino group-containing acrylic acid esters such as diethylaminoethyl(meth)acrylate and dibutylaminoethyl(meth)acrylate; and methacrylates such as methyl methacrylate and octyl methacrylate.

Usable examples further include di(meth)acrylates of a diol such as a di(meth)acrylate of an ethylene oxide/propylene oxide copolymer, ethylene glycol di(meth)acrylate, 1,3-propanediol di(meth)acrylate, 1,4-butanediol di(meth)acrylate, 1,3-butylenediol di(meth)acrylate, 1,6-hexanediol di(meth)acrylate, polyethylene glycol di(meth)acrylate, and polypropylene glycol di(meth)acrylate.

For the acrylic acid alkyl esters, these monomer compounds may be used singly or in combination of two or more of them.

The present invention desirably uses an acrylic rubber obtained by copolymerization of such an acrylic acid alkyl ester and a functional group monomer. Though not critical, the functional group monomer preferably has a functional group that can form a cross-linking site. Specific examples include a carboxyl group-containing acrylic rubber using a carboxyl group-containing monomer, an active chlorine group-containing acrylic rubber using an active chlorine group-containing monomer, and an epoxy group-containing acrylic rubber using an epoxy group-containing monomer.

The carboxyl group-containing monomer is exemplified by a carboxyl group-containing unsaturated fatty acid. Examples of the carboxyl group-containing unsaturated fatty acid include unsaturated carboxylic acids such as acrylic acid and methacrylic acid. Other examples include aliphatic unsaturated dicarboxylic acids such as maleic acid, fumaric acid, itaconic acid, and citraconic acid and monomethyl esters, monoethyl esters, mono-n-propyl esters, monoisopropyl esters, mono-n-butyl esters, monoisobutyl esters, monocyclopentyl esters, monocyclohexyl esters, monocycloheptyl esters, monocyclooctyl esters, monomethylcyclohexyl esters, mono-3,5-dimethylcyclohexyl esters, monodicyclopentanyl esters, monoisobornyl esters, monocyclopentenyl esters, monocyclohexenyl esters, monocycloheptenyl esters, monocyclooctenyl esters, and monodicyclopentadienyl esters of them. The carboxyl group may have an anhydride structure, and carboxylic acid anhydride monomers such as maleic anhydride and citraconic anhydride may be used.

These carboxyl group-containing unsaturated fatty acids may be used in combination of two or more of them. It is preferable that the carboxyl group-containing unsaturated fatty acid is copolymerized so as to have a ratio of 0.1 to 20% by mass and preferably 0.1 to 10% by mass in a carboxyl group-containing acrylic rubber to be obtained because the carboxyl group-containing acrylic rubber obtains improved vulcanization characteristics.

The active chlorine group-containing monomer is also not specifically limited. For example, one or more active chlorine group-containing monomers selected from the group consisting of 2-chloroethyl vinyl ether, 2-chloroethyl acrylate, vinylbenzyl chloride, vinyl chloroacetate, and allyl chloroacetate may be used.

The epoxy group-containing monomer is also not specifically limited. For example, one or more epoxy group-containing monomers selected from the group consisting of glycidyl acrylate, glycidyl methacrylate, allyl glycidyl ether, and methallyl glycidyl ether may be used.

The functional group monomers such as the carboxyl group-containing monomer, the active chlorine group-containing monomer, and the epoxy group-containing monomer may be singly copolymerized with an acrylic acid alkyl ester, and two or more of the functional group monomers may be copolymerized with an acrylic acid alkyl ester. The functional group-containing acrylic rubbers after the copolymerization may be singly used for the composition or may be used in combination of two or more of them for the same composition.

The carboxyl group-containing acrylic rubber, the active chlorine group-containing acrylic rubber, and the epoxy group-containing acrylic rubber may be copolymerized with another copolymerizable monomer as long as the effect of the invention is not impaired.

Examples of the copolymerizable monomer include alkyl vinyl ketones such as methyl vinyl ketone; vinyl and allyl ethers such as vinyl ethyl ether, vinyl butyl ether, and allyl methyl ether; vinyl aromatic compounds such as styrene, α-methylstyrene, chlorostyrene, divinylbenzene, vinyltoluene, and vinylnaphthalene; vinyl nitriles such as acrylonitrile and methacrylonitrile; and ethylenic unsaturated compounds such as acrylamide, methacrylamide, vinyl acetate, ethylene, propylene, butadiene, isoprene, chloroprene, piperylene, pentadiene, dicyclopentadiene, ethylidene norbornene, norbornadiene, 1,4-hexadiene, vinyl chloride, vinylidene chloride, vinyl fluoride, vinylidene fluoride, vinyl propionate, and an alkyl fumarate. It is preferable that the other copolymerizable monomer is copolymerized so as to have a ratio of 0.1 to 10% by mass in an acrylic rubber to be obtained.

Examples of the emulsifier usable in the emulsion polymerization include benzenesulfonates such as styrenesulfonic acid and sodium dodecylbenzenesulfonate; nonionic emulsifiers such as a polyoxyethylene alkyl ether, a polyoxyethylene alkyl ester, a polyoxyethylene alkylphenol ether, and a polyoxyethylene sorbitan alkyl ester; salts of a fatty acid such as oleic acid, linolenic acid, myristic acid, and palmitic acid; salts of a higher alcohol sulfate such as sodium lauryl sulfate; anionic emulsifiers such as a salt of an alkylsulfosuccinic acid; and cationic emulsifiers such as an alkyltrimethylammonium chloride, a dialkylammonium chloride, and benzyl ammonium chloride. These emulsifiers may be used singly or in combination of two or more of them. The emulsifier is preferably used in an amount of 0.1 to 10 parts by weight based on 100 parts by weight of the monomer mixture. Here, "monomer" means the monomer that is a raw material of the acrylic rubber, and the monomer mixture is a mixture of a (meth)acrylic acid alkyl ester and a monomer to be copolymerized with the (meth)acrylic acid alkyl ester.

Examples of the polymerization initiator include inorganic peroxides such as potassium persulfate, sodium persulfate, and ammonium persulfate; azo compounds such as AIBN (azobisisobutyronitrile); and organic peroxides such as diisopropylbenzene hydroperoxide, cumene hydroperoxide, and BPO (benzoyl peroxide). These polymerization initiators may be used singly or in combination of two or more of them. The polymerization initiator is preferably used in an amount of 0.001 to 1 part by weight based on 100 parts by weight of the monomer mixture.

The combination use of the organic peroxide and the inorganic peroxide with a reducing agent can serve as a redox polymerization initiator. Examples of the reducing agent to be combined include, but are not necessarily limited to, amine compounds such as dimethylaniline; metal ion compounds having a low oxidation number, such as ferrous sulfate and cuprous naphthenate; and methane compounds such as sodium methanesulfonate. These reducing agents may be used singly or in combination of two or more of them. The reducing agent is preferably used in an amount of 0.001 to 0.1 part by weight based on 100 parts by weight of the peroxide.

Examples of the polymerization terminator include sodium dimethyldithiocarbamate, diethylhydroxylamine, hydroxylamine, hydroxylamine sulfate, hydroxylamine sulfonic acid, and an alkali metal salt of them. The polymerization terminator is used in an amount of 0.1 to 2 parts by weight based on 100 parts by weight of the total monomers.

The acrylic rubber preferably has a Mooney viscosity [ML1+4, 100° C.] of 10 to 80 and more preferably 20 to 60. Here, "ML1+4" means that a L-roller used for the measurement of Mooney viscosity is pre-heated for 1 minute and rotated for 4 minutes, and "100° C." means the test temperature. In order to increase the Mooney viscosity, the amount of a chain transfer agent is reduced, while in order to reduce the Mooney viscosity, the amount of a chain transfer agent is increased.

As the chain transfer agent, an agent commonly used for polymerization may be used. Examples of the chain transfer agent include, but are not necessarily limited to, methyl mercaptan, ethyl mercaptan, n-propyl mercaptan, isopropyl mercaptan, n-butyl mercaptan, isobutyl mercaptan, sec-butyl mercaptan, tert-butyl mercaptan, n-amyl mercaptan, isoamyl mercaptan, tert-amyl mercaptan, n-hexyl mercaptan, n-heptyl mercaptan, n-octyl mercaptan, n-nonyl mercaptan, n-decyl mercaptan, n-dodecyl mercaptan, t-dodecyl mercaptan, cyclopentyl mercaptan, cyclohexyl mercaptan, phenyl mercaptan, benzyl mercaptan, 2-naphthalenethiol, o-toluenethiol, m-toluenethiol, p-toluenethiol, 5-tert-butyl-2-methylthiophenol, 3-methoxythiophenol, 4-methoxy-α-toluenethiol, 2-mercaptoethyl sulfide, 1,2-benzenedithiol, 1,4-benzenedithiol, 2-aminobenzenethiol, 1,6-hexanedithiol, and α-methylstyrene.

<Functionalized Silicone Oil>

A silicone oil is an oily substance having a polysiloxane structure and the number of siloxane linkages is typically 2,000 or less in the structure.

The functionalized silicone oil is added in order to improve the heat resistance of the acrylic rubber composition and to suppress the adhesion of the acrylic rubber composition to a roll metal surface. The functionalized silicone oil has a polydimethylsiloxane structure represented by General Formula 1 and having at least one binding site bonded with a functional group.

[C.3]

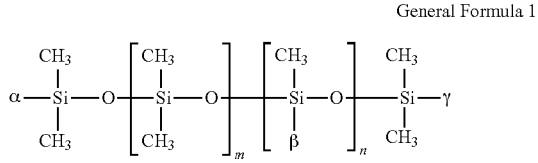

General Formula 1

(In General Formula 1, each of m and n independently represents an arbitrary integer. Each of α, β, and γ represents a binding site for a functional group)

The functional group bonded to the binding sites of α, β, and γ is not specifically limited. The functional group is, for example, at least one of a monoamino group, a diamino group, a polyether group, an epoxy group, an alicyclic epoxy group, a hydroxyl group, a thiol group, a carboxyl group, a hydrogen group (Si—H), a methacryl group, a phenol group, an alkoxy group, an ester group, an amide group, an alkyl group, a fluoroalkyl group, and a diol group represented by General Formulae 2 to 15 below. Here, examples of the hydroxyl group include a carbinol group that is C—OH in a chemical structure and a silanol structure that is OH directly bonded to Si in polydimethylsiloxane.

[C.4]

—R—NH₂                                                      General Formula 2

[C.5]

—R—NH—R'NH₂                                  General Formula 3

[C.6]

—R—(C₂H₄O)ₘ(C₃H₆O)ₙ—R'              General Formula 4

[C.7]

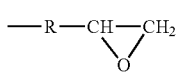
                                                      General Formula 5

[C.8]

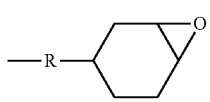
                                                       General Formula 6

[C.9]

—R—OH                                              General Formula 7

[C.10]

—R—SH                                              General Formula 8

[C.11]

—R—COOH                                       General Formula 9

[C.12]

—H                                                         General Formula 10

[C.13]

—R—OCOC(CH₃)=CH₂                 General Formula 11

[C.14]

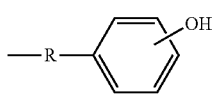
                                                      General Formula 12

[C.15]

—R—OR'                                         General Formula 13

[C.16]

—R—OCOR                                  General Formula 14

[C.17]

—R—NHCOR'                             General Formula 15

[C.18]

—CₘHₙ                                             General Formula 16

[C.19]

—CH₂CH₂CF₃                             General Formula 17

[C.20]

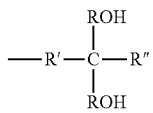
                                                      General Formula 18

In General Formulae 2 to 18, each of m and n independently represents an arbitrary integer. R, R', and R" are an organic substituent and preferably an alkyl group having 1 to 20 carbon atoms and/or an alkylene group having 1 to 20 carbon atoms. R, R', and R" may be the same organic substituent or different organic substituents to each other.

The silicone oil preferably has a functional group equivalent weight of 1 to 100,000 (g/mol). The functional group equivalent weight is more preferably 10 to 70,000 and even more preferably 15 to 55,000. The type of the functional group bonded to the binding sites α, β, and γ may be one or may be two or more. The functionalized silicone oils may be singly added to the composition or may be added in combination of two or more of them to the same composition. In the present invention, the addition of at least one functionalized silicone oil to the composition can lead to the intended effect.

The functional group equivalent weight means the mass of a main skeleton (for example, polydimethylsiloxane) to which 1 mol of a functional group is bonded. The determination method of the functional group equivalent weight will be described below. With a nuclear magnetic resonance (NMR) apparatus, the spectrum intensity of H in the siloxane structure (Si—(CH₃)₂) and the spectrum intensity of a functional group are determined. Then, the intensity ratio of them is calculated to determine the ratio NB of the number A of the siloxane structures and the number B of the functional groups. The molecular weight of one siloxane structure is multiplied by the number ratio NB to determine the mass of the main skeleton (the mass of the siloxane structure) per functional group, and the mass is multiplied by Avogadro's number to determine the functional group equivalent weight (g/mol).

The functional group of the silicone oil is not specifically limited but is preferably a group that can be bonded to a functional group in the acrylic rubber. Examples include a silicone oil having a functional group that is bonded to a carboxyl group or an ester moiety in the carboxyl group-containing acrylic rubber through a nucleophilic substitution reaction in a basic condition. The use of such a silicone oil suppresses the shift of the silicone oil to a surface due to bleeding and improves the heat resistance of a carboxyl group-containing acrylic rubber composition to be obtained.

In order to achieve such an object, the silicone oil preferably includes a functional group such as a monoamino group, a diamino group, an epoxy group, an alicyclic epoxy group, a hydroxyl group, a thiol group, a carboxyl group, a hydrogen group, a phenol group, and a diol group.

The functionalized silicone oil desirably has a molecular weight where the functionalized silicone oil does not volatilize at an ambient temperature (5 to 35° C.). The functionalized silicone oil is also required to have a molecular weight where the functionalized silicone oil is well dispersed in the acrylic rubber. That is, the functionalized silicone oil preferably has a dynamic viscosity ranging from 0.1 to 1,000,000 mm²/second at 25° C.

Such a functionalized silicone oil is included in a range of 0.3 to 30 parts by mass, preferably in a range of 0.4 to 20 parts by mass, and more preferably in a range of 0.4 to 10 parts by mass, based on 100 parts by mass of the acrylic rubber. Such a condition can lead to the productions of an acrylic rubber having excellent heat resistance and a cross-linked product of the acrylic rubber.

<Polyamine Compound>

The polyamine compound is added as a vulcanizing agent of the acrylic rubber. As the polyamine compound, at least one of an aromatic polyamine compound and an aliphatic polyamine compound is used.

The aromatic polyamine compound is a compound represented by General Formula (19). Examples of the aromatic polyamine compound include, but are not necessarily limited to, 4,4'-bis(4-aminophenoxy)biphenyl, 4,4'-diaminodiphenyl sulfide, 1,3-bis(4-aminophenoxy)-2,2-dimethylpropane, isophthalic acid dihydrazide, 1,3-bis(4-aminophenoxy)benzene, 1,4-bis(4-aminophenoxy)benzene, 1,4-bis(4-aminophenoxy)pentane, 2,2-bis[4-(4-aminophenoxy)phenyl]propane, 2,2-bis[4-(4-aminophenoxy)phenyl]sulfone, 4,4'-diaminodiphenyl sulfone, bis[4-(3-aminophenoxy)phenyl]sulfone, 2,2-bis[4-(4-aminophenoxy)phenyl]hexafluoropropane, 3,4'-diaminodiphenyl ether, 4,4'-diaminodiphenyl ether, 4,4-sulfonaminobenzanilide, and bis[4-(4-aminophenoxy)phenyl]sulfone.

[C.21]

$$H_2N\text{-}Ph\text{-}M\text{-}Ph\text{-}NH_2 \quad \text{General Formula 19}$$

In the formula, M represents one of O, S, $SO_2$, CONH, and O—R—O. R in O—R—O represents one of Ph, Ph-Ph, Ph-$SO_2$-Ph, $(CH_2)_m$, Ph-$CH_2$—$C(CX_3)_2$—$CH_2$-Ph, and $(CH_2)C(CH_3)_2(CH_2)$. m is 3 to 5, X is hydrogen (H) or fluorine (F), and Ph represents a benzene ring.

Examples of the aliphatic polyamine compound include, but are not necessarily limited to, hexamethylenediamine, hexamethylenediamine carbamate, N,N'-dicinnamylidene-1,6-hexanediamine, diethylenetriamine, triethylenetetramine, and tetraethylenepentamine. These polyamine compounds may be used singly or in combination of two or more of them.

The polyamine compound is suitably included in a range of 0.1 to 2.0 parts by mass and more preferably 0.6 to 1.5 parts by mass based on 100 parts by mass of the acrylic rubber. The addition of the polyamine compound in a suitable amount can lead to a necessary and sufficient vulcanization reaction of the acrylic rubber and consequently can improve mechanical characteristics and compression set characteristics of an acrylic rubber composition to be obtained.

<Other Additives>

The acrylic rubber composition may include a filler, a reinforcement, a plasticizer, an age inhibitor, a stabilizer, a lubricant, and the like to be molded and vulcanized depending on an intended product for practical use.

As the filler and the reinforcement, a filler and a reinforcement commonly used for rubber may be used. Examples include, but are not necessarily limited to, carbon black, acetylene black, silicic anhydride such as silica, and surface treated calcium carbonate. These fillers and reinforcements may be used singly or in combination of two or more of them. The filler and the reinforcement are preferably included in a total amount of 30 to 100 parts by mass based on 100 parts by mass of the acrylic rubber.

Usable examples of the filler include carbon black, acetylene black, Ketjenblack, talc, calcium carbonate, clay, calcined clay, aluminium hydroxide, barium sulfate, and whiskadelite. These fillers may be surface treated for use. It is known that there fillers have variations in production process, average particle diameter, surface area, oil absorption, and the like, but any filler may be used. Among the fillers, the carbon black and the acetylene black are especially preferred for the present invention. Usable examples of the carbon black include various types such as SAF, ISAF, ISAF-HS, HAF, HAF-HS, FEF, GPF, SRF, MT, and FT.

As the plasticizer, various plasticizers commonly used for rubber may be used. Examples include, but are not necessarily limited to, ester plasticizers such as a phthalic acid ester, an adipic acid ester, a sebacic acid ester, a maleic acid ester, a trimellitic acid ester, a pyromellitic acid ester, an azelaic acid ester, an oleic acid ester, a stearic acid ester, a sulfonic acid ester, a glutaric acid ester, a glycol ester, a citric acid ester, and a ricinoleic acid ester; polyester plasticizers; epoxy plasticizers; ether plasticizers such as polyoxyethylene ether; and ether thioester plasticizers. These plasticizers may be used singly or in combination of two or more of them. The plasticizer is preferably included in a range of less than about 50 parts by mass based on 100 parts by mass of the acrylic rubber.

Examples of a softener, an extender oil, and the like include aromatic process oils, naphthenic process oils, and paraffinic process oils.

As the age inhibitor, an age inhibitor commonly used for rubber may be used. Examples include, but are not necessarily limited to, amine age inhibitors such as phenyl-α-naphthylamine, phenyl-β-naphthylamine, p-(p-toluenesulfonylamide)diphenylamine, 4,4'-(α,α'-dimethylbenzyl)diphenylamine, 4,4'-octyldiphenylamine, octylated diphenylamine, N-isopropyl-N'-phenyl-p-phenylenediamine, N,N'-di-2-naphthyl-p-phenylenediamine, and N-(1,3-dimethylbutyl)-N'-phenyl-p-phenylenediamine; phenol age inhibitors such as 2,6-di-t-butyl-4-methylphenol, styrenated phenol, 2,2'-methylenebis(4-methyl-6-t-butylphenol), 1,3,5-trimethyl-2,4,6-tris(3,5-di-t-butyl-4-hydroxybenzyl)benzene, 4,4'-thiobis(6-t-butyl-3-methylphenol), 4,4'-butylidenebis(3-methyl-6-t-butylphenol), n-octadecyl-3-(4'-hydroxy-3',5'-di-t-butylphenyl)propionate, and tetrakis[methylene-3-(3',5'-di-t-butyl-4'-hydroxyphenyl)propionate] methane; quinoline age inhibitors such as a polymer of 2,2,4-trimethyl-1,2-dihydroquinoline and 6-ethoxy-2,2,4-trimethyl-1,2-dihydroquinoline; phosphorous age inhibitors such as tris(nonylphenyl)phosphite, tris(2,4-di-t-butylphenyl)phosphite, and cyclic neopentane tetraylbis(2,6-di-t-butyl-4-methylphenyl)phosphite; sulfur-containing age inhibitors such as dilauroyl thiodipropionate, distearyl thiodipropionate, and pentaerythritol tetrakis(β-lauryl thiopropionate); benzimidazole age inhibitors such as 2-mercaptobenzimidazole, 2-mercaptomethylbenzimidazole, and a zinc salt of 2-mercaptomethylbenzimidazole; and other age inhibitors such as nickel dimethyldithiocarbamate, nickel dibutyldithiocarbamate, 1,3-bis(dimethylaminopropyl)-2-thiourea, and tributylthiourea.

As the antiozonant, waxes may be used. The age inhibitor is preferably included in a range of 0.3 to 10 parts by mass based on 100 parts by mass of the acrylic rubber. The age inhibitors may be used in combination of two or more of them. In particular, the use of the amine age inhibitor in combination with the phosphorous age inhibitor or the sulfur-containing age inhibitor can lead to excellent heat resistance. Such a combination use is exemplified by the combination of 4,4'-bis(α,α-dimethylbenzyl)diphenylamine and tris(nonylphenyl)phosphite.

As a vulcanization accelerator, a vulcanization accelerator commonly used for rubber may be used. Examples include, but are not necessarily limited to, guanidines such as diphenylguanidine, di-o-tolylguanidine, o-tolylbiguanide, and a di-o-tolylguanidine salt of dicatechol borate; thiazoles such as 2-mercaptobenzothiazole, dibenzothiazyl disulfide, zinc 2-mercaptobenzothiazole, a cyclohexylamine salt of 2-mercaptobenzothiazole, and 2-(4'-morpholinodithio)benzothiazole; sulfenamides such as N-cyclohexyl-2-benzothiazylsulfenamide, N,N-dicyclohexyl-2-benzothiazylsulfenamide, N-oxydiethylene-2-benzothiazylsulfenamide, N,N-diisopropyl-2-benzothiazylsulfenamide, and N-t-butyl-2-benzothiazylsulfenamide; thioureas such as thiocarbanilide, ethylene thiourea (2-mercaptoimidazoline), diethylthiourea, dibutylthiourea, and trimethylthiourea; thiurams such as tetramethylthiuram monosulfide, tetramethylthiuram disulfide, tetraethylthiuram monosulfide, tetrabutylthiuram monosulfide, N,N'-dimethyl-N,N'-diphenylthiuram disulfide, and pentamethylenethiuram tetrasulfide; dithiocarbamates such as zinc dimethylcarbamate, zinc diethylcarbamate, and zinc dibutylcarbamate; and alkylamines such as di-n-butylamine, dicyclohexylamine, monoethanolamine, diethanolamine, triethanolamine, and dibenzylamine.

As a coagent, a coagent commonly used for rubber may be used. Examples include, but are not necessarily limited to, polyunsaturated compounds such as ethylene glycol dimethacrylate, trimethylolpropane trimethacrylate, N,N'-m-phenylenedimaleimide, triallyl isocyanurate, and zinc methacrylate.

The rubber component in the acrylic rubber composition includes the acrylic rubber as a main component but may include as necessary, in addition to the acrylic rubber, a natural rubber and synthetic rubbers such as IIR (isobutylene-isoprene copolymer), BR (butadiene rubber), NBR (nitrile rubber), HNBR (hydrogenated nitrile rubber), CR (chloroprene rubber), EPDM (ethylene propylene diene rubber), FKM (fluororubber), Q (silicone rubber), CSM (chlorosulfonated polyethylene rubber), CO (epichlorohydrin rubber), ECO (epichlorohydrin-ethylene oxide copolymer), and CM (chlorinated polyethylene). The main component means a component having a content of 50% by mass or more. That is, in the acrylic rubber composition of the present invention, the rubber component includes the acrylic rubber in an amount of 50% by mass or more.

As apparatuses for kneading, molding, and vulcanizing the acrylic rubber composition and a vulcanized product of the composition, apparatuses commonly used in rubber industry may be used.

<Application>

The acrylic rubber composition and a vulcanized product of the composition is used especially for a rubber hose, a seal such as a gasket and a packing, and a vibration isolator. Usable examples of the rubber hose specifically include a transmission oil cooler hose, an engine oil cooler hose, a turbo intercooler hose, a turbo air duct hose, a power steering hose, a hot air hose, a radiator hose, a diesel turbocharger hose, and other hoses such as an oil system hose, a fuel system hose, and a drain system hose included in a high-pressure system in industrial machinery and construction machinery.

Specific examples of the seal include an engine head cover gasket, an oil pan gasket, an oil seal, a rip seal packing, an O-ring, a transmission seal gasket, a crankshaft and camshaft seal gasket, a valve stem, a power steering seal belt cover seal, and CVJ and R&P boot materials.

Examples of the rubber vibration isolator include a damper pulley, a center support cushion, a suspension bush, and an engine mount. In particular, the acrylic rubber composition and a vulcanized product of the composition of the present invention have excellent mechanical properties as well as excellent cold resistance, oil resistance, and heat resistance and hence are preferably used as rubber hoses and oil seal products such as a gasket for automobiles in recent severe usage environments.

The structure of the rubber hose may be a single layer hose obtained from the acrylic rubber composition of the present invention or a composite hose that is composed of a layer including the acrylic rubber composition of the present invention in combination with an inner layer, an intermediate layer, or an outer layer including a synthetic rubber except for the acrylic rubber composition of the present invention, such as a fluororubber, a fluorine-modified acrylic rubber, a hydrin rubber, CSM, CR, NBR, HNBR, and an ethylene-propylene rubber, depending on an application of the rubber hose. Depending on the characteristics required for the rubber hose, a reinforcing fiber or wire may be provided in an intermediate layer of a hose or in the outermost layer of a rubber hose as is commonly done.

EXAMPLES

Hereinafter, the present invention will be described in further detail with reference to examples, but the present invention is not necessarily limited to these examples.

Example 1

A mixture of 100 parts by mass of acrylic rubber, 1 part by mass of stearic acid, 1 part by mass, of 4,4-bis($\alpha,\alpha$-dimethylbenzyl)diphenylamine (manufactured by Ouchi Shinko Chemical Industrial Co., Ltd.; Nocrac CD), 60 parts by mass of carbon black (FEF carbon manufactured by Asahi Carbon Co., Ltd.; Asahi #60), 0.3 part by mass of stearylamine (manufactured by Kao Corporation; Farmin 80), 1 part by mass of liquid paraffin, and a carboxyl group-modified silicone oil (manufactured by Shin-Etsu Chemical Co., Ltd.; X-22-3701E) was kneaded using an 8-inch roll to produce a carboxyl group-containing acrylic rubber composition. The acrylic rubber used in Example 1 was a carboxyl group-containing acrylic rubber that was obtained from ethyl acrylate, n-butyl acrylate, and acrylic acid through emulsion polymerization.

<Vulcanization>

The obtained acrylic rubber composition was heat-treated using an electric heat press at 170° C. for 20 minutes to prepare a primary vulcanized product. The obtained primary vulcanized product was further heat-treated in a gear oven at 170° C. for 4 hours to produce a secondary vulcanized product.

<Evaluation Test>

The tensile strength and the elongation of the secondary vulcanized product were evaluated in accordance with JIS K6251, and the hardness was evaluated using a durometer in accordance with JIS K6253. The tensile strength, the elongation, and the hardness of the secondary vulcanized product were determined after treatment at 190° C. for 168 hours in accordance with JIS K6257 to evaluate the heat aging properties (heat resistance). The compression set was evaluated in a condition at 150° C. for 70 hours in accordance with JIS K6262. JIS is the abbreviation of the Japanese Industrial Standards Committee.

As a kneading processability of the unvulcanized compound, two-roll performance was evaluated. The roll performance was evaluated as "good" when a compound was wound onto a metal roll, the roll surface did not have adhesion, and the kneading was readily performed, while evaluated as "poor" when a compound was not wound onto a roll or a roll had strong adhesion and the kneading was difficult. For the evaluation of bleeding properties, the vulcanized product (a vulcanized sheet having a thickness of 2 mm) was left at 23° C. for 1 week, and then the bleeding properties of silicone oil to a rubber surface was observed. The vulcanized product having a rubber surface with the bleeding of silicone oil is not preferred for appearance or as a product.

Examples 2 to 15 and Comparative Examples

Based on the formulations shown in Table 1 and Table 2, the acrylic rubber composition, the primary vulcanized product, and the secondary vulcanized product were obtained in the same manner as in Example 1 and were evaluated in the same manner as in Example 1.

TABLE 1

| | | | Examples | | | | | | | |
|---|---|---|---|---|---|---|---|---|---|---|
| | | | X-22-3701E (carboxyl group on side chains) | | | | | | X-22-162C (carboxyl group on both ends) | |
| | | Unit | 1 Part Example 1 | 5 Part Example 2 | 10 Part Example 3 | 20 Part Example 4 | 0.3 Part Example 5 | 30 Part Example 6 | 1 Part Example 7 | 5 Part Example 8 |
| Formulation | Acrylic rubber | Parts by mass | 100.0 | 100.0 | 100.0 | 100.0 | 100.0 | 100.0 | 100.0 | 100.0 |
| | Stearic acid | | 1.0 | 1.0 | 1.0 | 1.0 | 1.0 | 1.0 | 1.0 | 1.0 |
| | Nocrac CD | | 1.0 | 1.0 | 1.0 | 1.0 | 1.0 | 1.0 | 1.0 | 1.0 |
| | FEF (#60) | | 60.0 | 60.0 | 60.0 | 60.0 | 60.0 | 60.0 | 60.0 | 60.0 |
| | Farmin 80 | | 0.3 | 0.3 | 0.3 | 0.3 | 0.3 | 0.3 | 0.3 | 0.3 |
| | Liquid paraffin | | 1.0 | 1.0 | 1.0 | 1.0 | 1.0 | 1.0 | 1.0 | 1.0 |
| | RS-735 | | — | — | — | — | — | — | — | — |
| | X-22-3701e | | 1.0 | 5.0 | 10.0 | 20.0 | 0.3 | 30.0 | — | — |
| | X-22-162C | | — | — | — | — | — | — | 1.0 | 5.0 |
| | KF-865 | | — | — | — | — | — | — | — | — |
| | X-22-4015 | | — | — | — | — | — | — | — | — |
| | X-22-3820W | | — | — | — | — | — | — | — | — |
| | X-22-2000 | | — | — | — | — | — | — | — | — |
| | KF-2004 | | — | — | — | — | — | — | — | — |
| | DOTG | | 1.0 | 1.0 | 1.0 | 1.0 | 1.0 | 1.0 | 1.0 | 1.0 |
| | Diak#1 | | — | — | — | — | — | — | — | — |
| | KA-4 | | 1.0 | 1.0 | 1.0 | 1.0 | 1.0 | 1.0 | 1.0 | 1.0 |
| | Total amount | | 166.3 | 170.3 | 175.3 | 185.3 | 165.6 | 195.3 | 166.3 | 170.3 |
| Basic physical properties | Tensile strength | TB MPa | 11.4 | 10.4 | 9.7 | 8.0 | 11.4 | 7.7 | 11.4 | 10.4 |
| | Elongation | EB % | 233 | 229 | 211 | 200 | 243 | 185 | 230 | 220 |
| | Hardness | HS Shore A | 68 | 62 | 63 | 57 | 68 | 52 | 67 | 65 |
| Heat resistance | 190° C. × 168 h | TB MPa | 7.0 | 6.2 | 6.2 | 4.7 | 5.9 | 4.3 | 7.0 | 6.3 |
| | | EB % | 192 | 168 | 169 | 165 | 122 | 159 | 178 | 168 |
| | | ΔHs pt | 9 | 11 | 12 | 13 | 12 | 13 | 11 | 11 |
| Compression set | 150° C. × 70 h | CS % | 16 | 17 | 18 | 20 | 22 | 28 | 16 | 16 |
| | Roll performance | | Good | Good | Good | Good | Good | Good | Good | Good |
| | Bleeding properties | | Not bleed | Not bleed | Not bleed | Not bleed | Not bleed | Not bleed | Not bleed | Not bleed |

| | | | KF-865 Monoamine | 4015 Carbinol | 3820W Diamine | 2000 Epoxy | KF-2004 Mercapto | X-22-3701E Carboxyl group on side chains | |
|---|---|---|---|---|---|---|---|---|---|
| | | Unit | Example 9 | Example 10 | Example 11 | Example 12 | Example 13 | Example 14 | Example 15 |
| Formulation | Acrylic rubber | Parts by mass | 100.0 | 100.0 | 100.0 | 100.0 | 100.0 | 100.0 | 100.0 |
| | Stearic acid | | 1.0 | 1.0 | 1.0 | 1.0 | 1.0 | 1.0 | 1.0 |
| | Nocrac CD | | 1.0 | 1.0 | 1.0 | 1.0 | 1.0 | 1.0 | 1.0 |
| | FEF (#60) | | 60.0 | 60.0 | 60.0 | 60.0 | 60.0 | 60.0 | 60.0 |
| | Farmin 80 | | 0.3 | 0.3 | 0.3 | 0.3 | 0.3 | 0.3 | 0.3 |
| | Liquid paraffin | | 1.0 | 1.0 | 1.0 | 1.0 | 1.0 | 1.0 | 1.0 |
| | RS-735 | | — | — | — | — | — | 5.0 | — |
| | X-22-3701e | | — | — | — | — | — | 5.0 | 5.0 |
| | X-22-162C | | — | — | — | — | — | — | — |
| | KF-865 | | 5.0 | — | — | — | — | — | — |
| | X-22-4015 | | — | 5.0 | — | — | — | — | — |
| | X-22-3820W | | — | — | 5.0 | — | — | — | — |
| | X-22-2000 | | — | — | — | 5.0 | — | — | — |
| | KF-2004 | | — | — | — | — | 5.0 | — | — |
| | DOTG | | 1.0 | 1.0 | 1.0 | 1.0 | 1.0 | 1.0 | — |
| | Diak#1 | | — | — | — | — | — | — | 0.6 |
| | KA-4 | | 1.0 | 1.0 | 1.0 | 1.0 | 1.0 | 1.0 | 1.0 |
| | Total amount | | 170.3 | 170.3 | 170.3 | 170.3 | 170.3 | 175.3 | 169.9 |
| Basic physical properties | Tensile strength | TB MPa | 10.5 | 9.7 | 10.1 | 11.8 | 10.3 | 10.9 | 11.4 |
| | Elongation | EB % | 250 | 208 | 238 | 225 | 243 | 245 | 208 |
| | Hardness | HS Shore A | 62 | 63 | 64 | 65 | 65 | 60 | 67 |
| Heat resistance | 190° C. × 168 h | TB MPa | 6.3 | 7.1 | 6.3 | 7.0 | 6.4 | 6.4 | 7.2 |
| | | EB % | 99 | 177 | 177 | 137 | 190 | 185 | 165 |
| | | ΔHs pt | 17 | 13 | 13 | 15 | 10 | 18 | 12 |
| Compression set | 150° C. × 70 h | CS % | 20 | 16 | 16 | 27 | 16 | 16 | 16 |
| | Roll performance | | Good | Good | Good | Good | Good | Good | Good |
| | Bleeding properties | | Not bleed | Not bleed | Not bleed | Not bleed | Not bleed | Not bleed | Not bleed |

TABLE 2

| | | | | Comparative examples | | | | | |
|---|---|---|---|---|---|---|---|---|---|
| | | | | Without plasticizer | RS-735 | KF-96 (Non-modified) | | X-22-3701E (Carboxyl group on side chains) | |
| | | | Unit | Comparative Example 1 | Comparative Example 2 | 1 Part Comparative Example 3 | 5 Part Comparative Example 4 | 0.2 Part Comparative Example 5 | 40 Part Comparative Example 6 |
| Formulation | Acrylic rubber | | Parts by mass | 100.0 | 100.0 | 100.0 | 100.0 | 100.0 | 100.0 |
| | Stearic acid | | | 1.0 | 1.0 | 1.0 | 1.0 | 1.0 | 1.0 |
| | Nocrac CD | | | 1.0 | 1.0 | 1.0 | 1.0 | 1.0 | 1.0 |
| | FEF (#60) | | | 60.0 | 60.0 | 60.0 | 60.0 | 60.0 | 60.0 |
| | Farmin 80 | | | 0.3 | 0.3 | 0.3 | 0.3 | 0.3 | 0.3 |
| | Liquid paraffin | | | 1.0 | 1.0 | 1.0 | 1.0 | 1.0 | 1.0 |
| | RS-735 | | | — | 5.0 | — | — | — | — |
| | KF-96-300cs | | | — | — | 1.0 | 5.0 | — | — |
| | X-22-3701e | | | — | — | — | — | 0.2 | 40.0 |
| | DOTG | | | 1.0 | 1.0 | 1.0 | 1.0 | 1.0 | 1.0 |
| | KA-4 | | | 1.0 | 1.0 | 1.0 | 1.0 | 1.0 | 1.0 |
| | Total amount | | | 165.3 | 170.3 | 166.3 | 170.3 | 165.5 | 205.3 |
| Basic physical properties | Tensile strength | TB | MPa | 11.5 | 10.6 | 11.1 | 9.8 | 11.5 | 5.5 |
| | Elongation | EB | % | 252 | 262 | 226 | 246 | 248 | 162 |
| | Hardness | HS | Shore A | 68 | 65 | 68 | 62 | 68 | 43 |
| Heat resistance | 190° C. × 168 h | TB | MPa | 3.5 | 3.7 | 5.4 | 4.3 | 3.5 | 3.8 |
| | | EB | % | 21 | 46 | 55 | 59 | 21 | 129 |
| | | ΔHs | pt | 24 | 25 | 16 | 25 | 24 | 12 |
| Ccompression set | 150° C. × 70 h | CS | % | 30 | 20 | 16 | 17 | 28 | 36 |
| | Roll performance | | | Good | Good | Poor | Poor | Good | Good |
| | Bleeding properties | | | Not bleed | Not bleed | Not bleed | Bled | Not bleed | Bled |

In Table 1 and Table 2, RS-735 is a polyether ester plasticizer manufactured by ADEKA Corporation. X-22-162C is a carboxyl group-modified silicone oil (dual-end type) manufactured by Shin-Etsu Chemical Co., Ltd., X-22-2000 is an epoxy group-modified silicone oil (side-chain type) manufactured by Shin-Etsu Chemical Co., Ltd., X-22-4015 is a carbinol group-modified silicone oil (side-chain type) manufactured by Shin-Etsu Chemical Co., Ltd., and X-22-3820W is a diamine group-modified silicone oil (side-chain type) manufactured by Shin-Etsu Chemical Co., Ltd.

KF-865 is a monoamine group-modified silicone oil (side-chain type) manufactured by Shin-Etsu Chemical Co., Ltd., KF-96-300cs is a non-modified silicone oil manufactured by Shin-Etsu Chemical Co., Ltd., and KF-2004 is a mercapto group-modified silicone oil (side-chain type) manufactured by Shin-Etsu Chemical Co., Ltd. The non-modified silicone oil (KF-96-300cs) is a dimethyl silicone oil having methyl groups on all side chains of polysiloxane.

DOTG is di-ortho-tolylguanidine manufactured by Ouchi Shinko Chemical Industrial Co., Ltd., Diak #1 is hexamethylenediamine carbamate manufactured by DuPont, and KA-4 is 2,2-bis[4-(4-aminophenoxy)phenyl]propane manufactured by Wakayama Seika Kogyo Co., Ltd.

As apparent from Tables 1 and 2, it is revealed that, by using the composition of the present invention, not only the basic physical properties but also the heat resistance, the compression set characteristics, and the roll performance were excellent and the bleeding was not caused. From the results of Comparative Examples 1 and 2, the use of the plasticizer improved the compression set characteristics, but the heat resistance was significantly poor. From the results of Comparative Examples 3 and 4, the addition of the non-modified silicone oil slightly improved the heat resistance, but the roll performance was poor and the bleeding was caused with the increase in the addition amount. From the results of Comparative Examples 5 and 6, it is revealed that the modified silicone oil in an amount of less than 0.3 part by mass based on 100 parts by mass of the acrylic rubber reduced the heat resistance and the compression set characteristics.

It is revealed that the silicone oil in an amount of more than 30 parts by mass based on 100 parts by mass of the acrylic rubber improved the compression set characteristics and the heat resistance but caused the bleeding. In contrast, from the results of Examples 5 and 6, it is revealed that the silicone oil in an amount of 0.3 to 30 parts by mass based on 100 parts by mass of the acrylic rubber could suppress the bleeding. Comparing Examples 1 and 5, Example 1 had better heat resistance, while comparing Examples 4 and 6, Example 4 had better heat resistance. Therefore, it is revealed that the silicone oil is more preferably included in an amount of 1 to 20 parts by mass.

INDUSTRIAL APPLICABILITY

The acrylic rubber composition and a vulcanized product of the composition is used especially for a rubber hose, a seal such as a gasket and a packing, and a vibration isolator. Usable examples of the rubber hose specifically include a transmission oil cooler hose, an engine oil cooler hose, a turbo intercooler hose, a turbo air duct hose, a power steering hose, a hot air hose, a radiator hose, a diesel turbocharger hose, and other hoses such as an oil system hose, a fuel system hose, and a drain system hose included in a high-pressure system in industrial machinery and construction machinery. Specific examples of the seal include an engine head cover gasket, an oil pan gasket, an oil seal, a rip seal packing, an O-ring, a transmission seal gasket, a crankshaft and camshaft seal gasket, a valve stem, a power steering seal belt cover seal, and CVJ and R&P boot materials. Examples of the rubber vibration isolator include a damper pulley, a center support cushion, a suspension bush, and an engine mount. In particular, the acrylic rubber composition and a vulcanized product of the composition of the present invention have excellent mechanical properties as well as excellent cold resistance, oil resistance, and heat resistance and hence are preferably used as rubber hoses and oil seal products such as a gasket for automobiles in recent severe usage environments.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. An acrylic rubber composition comprising:
   an acrylic rubber;
   a functionalized silicone oil; and
   an aromatic polyamine, wherein:
   the acrylic rubber is at least one compound selected from a carboxyl group-containing acrylic rubber, an epoxy group-containing acrylic rubber, and an active chlorine group containing acrylic rubber,
   the silicone oil is included in an amount of 0.3 to 30 parts by mass based on 100 parts by mass of the acrylic rubber and has a polydimethylsiloxane structure represented by Formula 1 and having at least one of binding sites α, β, and γ bonded with a functional group and has a functional group equivalent of 1 to 100,000 (g/mol):

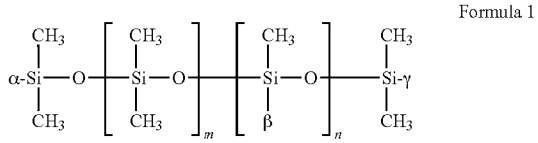

Formula 1 and the functional group bonded to the binding sites of α, β, and γ is a monoamino group, a diamino group, a polyether group, an epoxy group, an alicyclic epoxy group, a hydroxyl group, a thiol group, a carboxyl group, a hydrogen group (Si—H), a methacryl group, a phenol group, an alkoxy group, an ester group, an amide group, an alkyl group, a fluoroalkyl group, or a diol group.

2. The acrylic rubber composition according to claim 1, further comprising an aliphatic polyamine.

3. The acrylic rubber composition according to claim 2, wherein:
   the aromatic polyamine is a compound represented by the formula below:

$H_2N$-Ph-M-Ph-$NH_2$,

M represents one of O, S, $SO_2$, CONH, and O—R—O,
   R in O—R—O represents one of Ph, Ph-Ph, Ph-$SO_2$-Ph, $(CH_2)m$, Ph-$CH_2$—$C(CX_3)_2$—$CH_2$-Ph, $(CH_2)C(CH_3)_2$ $(CH_2)$, and $PhC(CH_3)_2$-Ph,
   Ph represents a benzene ring,
   m is 3 to 5,
   X is H or F, and
   Ph is a benzene ring.

4. A cross-linked product composition obtained by vulcanization of the acrylic rubber composition according to claim 1.

5. A rubber hose comprising the cross-linked product composition according to claim 4.

6. A seal comprising the cross-linked product composition according to claim 4.

7. A rubber vibration isolator for an automobile comprising the cross-linked product composition according to claim 4.

8. A rubber tube comprising the cross-linked product composition according to claim 4.

9. An industrial belt comprising the cross-linked product composition according to claim 4.

10. An industrial rubber vibration isolator comprising the cross-linked product composition according to claim 4.

11. A wire covering rubber comprising the cross-linked product composition according to claim 4.

12. A boot material for an automobile comprising the cross-linked product composition according to claim 4.

13. The acrylic rubber composition according to claim 3 where the aromatic polyamine is 2,2-bis[4-(4-aminophenoxy)phenyl]propane.

* * * * *